G. C. WALKER.
VENTILATOR.
APPLICATION FILED NOV. 27, 1909.

966,497.

Patented Aug. 9, 1910.

2 SHEETS—SHEET 1.

Witnesses
James F. Crown
E. M. Ricketts

Inventor
G. C. Walker
By Watson E. Coleman
Attorney

G. C. WALKER.
VENTILATOR.
APPLICATION FILED NOV. 27, 1909.
966,497.
Patented Aug. 9, 1910.
2 SHEETS—SHEET 2.
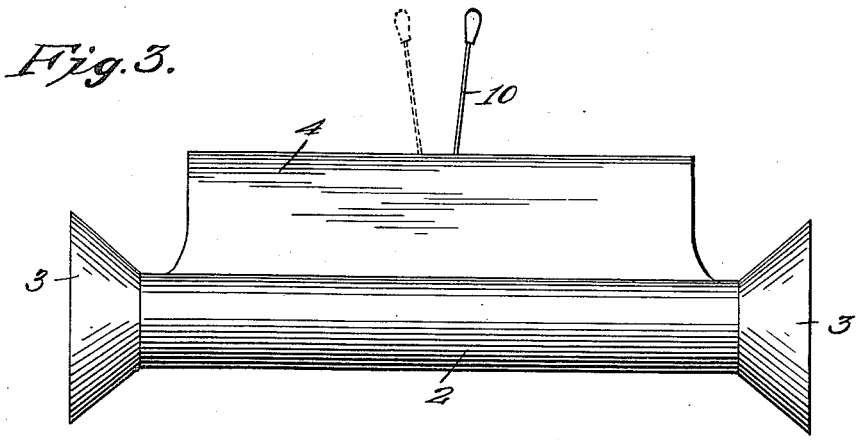
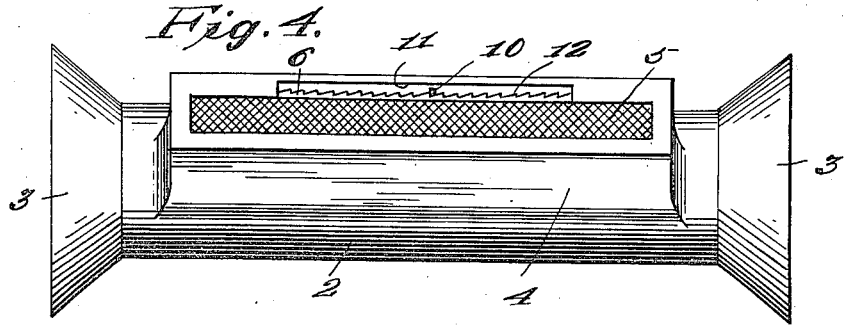
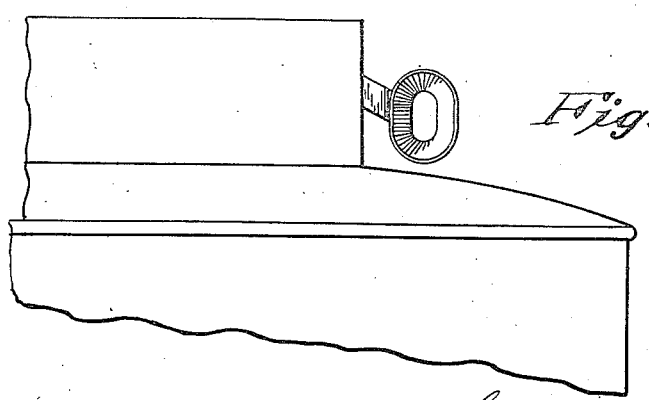
Witnesses
James F. Crown
E. M. Ricketts
Inventor
G. C. Walker
By Watson E. Coleman
Attorney

UNITED STATES PATENT OFFICE.

GRAUER C. WALKER, OF CHICAGO, ILLINOIS.

VENTILATOR.

966,497. Specification of Letters Patent. Patented Aug. 9, 1910.

Application filed November 27, 1909. Serial No. 530,222.

*To all whom it may concern:*

Be it known that I, GRAUER C. WALKER, a citizen of the United States, residing at Chicago, in the county of Cook and State of Illinois, have invented certain new and useful Improvements in Ventilators, of which the following is a specification, reference being had to the accompanying drawings.

This invention relates to improvements in ventilators for use on railway cars, automobiles, and other vehicles.

The object of the invention is to provide a simple and practical device of this character which may be applied to the side or top of a car or the like and which may be adjusted by the occupant, or occupants, of such car to control the inlet of fresh air.

With the above and other objects in view, the invention consists in the novel construction, combination and arrangement of parts hereinafter fully described and claimed, and illustrated in the accompanying drawings, in which—

Figure 1:
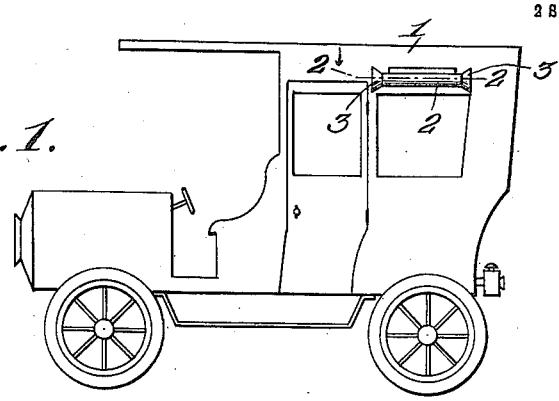
Figure 2:
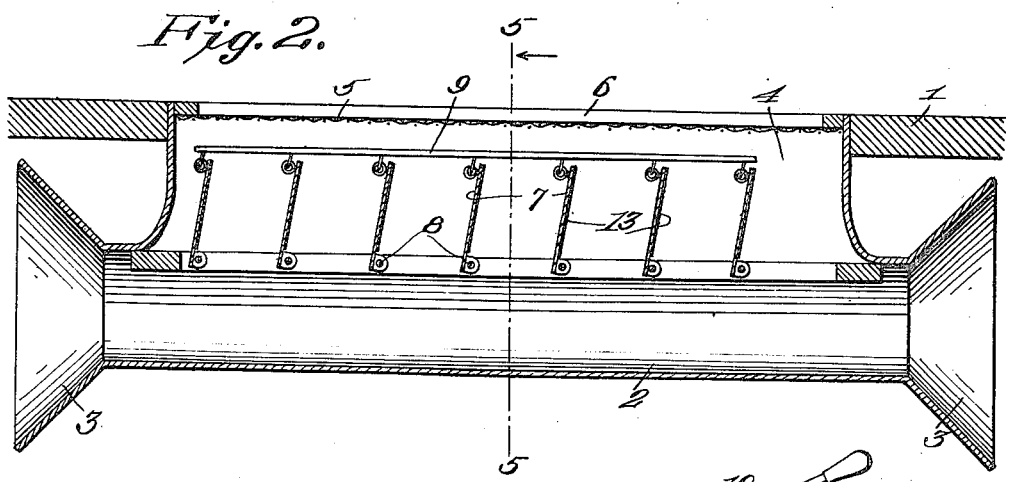
Figure 5:
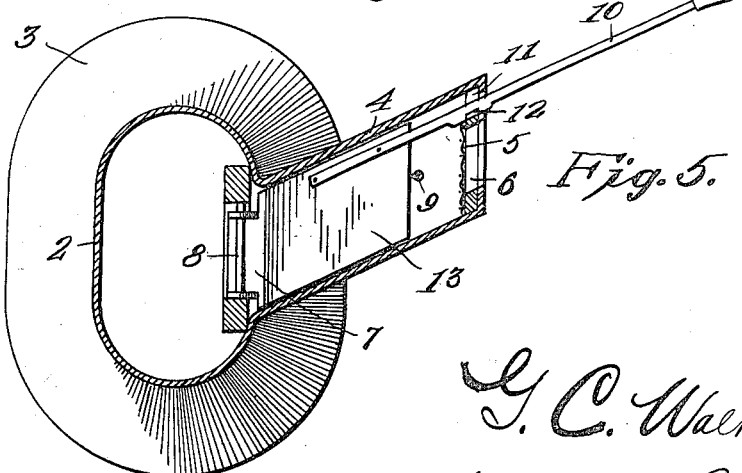

Figure 1 is a side view of an automobile showing the application of the invention thereto, Fig. 2 is an enlarged horizontal section taken on the plane indicated by the line 2—2 in Fig. 1, Figs. 3 and 4 are top and inner side views of the ventilator removed from its support, Fig. 5 is a vertical cross section taken on the plane indicated by the line 5—5 in Fig. 2, and Fig. 6 is a detail view showing the application of the invention to a railway car.

In the drawings 1 denotes a portion of the closed body of an automobile, car, or other vehicle and 2 denotes my improved ventilating device. The latter may be arranged at any point upon the sides, or top of the vehicle and it comprises a tubular body with flared or bell-shaped ends 3. Projecting laterally from the intermediate portion of the body 2 is a substantially rectangular box 4 which has its inner end in communication with the interior of the body 1 so that the draft of air which passes through the tubular body 2 of the device will draw the air out of the vehicle or car and also permit fresh air to enter. To prevent dust and dirt from entering the vehicle or car, the inner end of the box 4 is covered by a suitable screen 5 of woven wire or other material arranged in the frame which reinforces said end of the box. If desired, the frame 6 may be made comparatively heavy so that it can be placed in the top or bottom of a window frame and held in position by the window sash.

For the purpose of controlling the ventilation of the interior of the vehicle or car, a plurality of vertically disposed horizontally swinging shutter plates 7 are arranged in the box 4. These plates have their inner ends pivoted and their outer free ends are connected together for simultaneous movement by a connecting rod 9, as clearly shown in Fig. 2 of the drawings. The plates 7 are preferably formed from sheet metal and their pivotal mounting is effected by slitting and bending their ends to form upper and lower pivot ears $8^a$ which are arranged on vertical pivot pins 8 provided in the open portion of a rectangular frame $8^b$ which is secured in the body 2 at the box 4. These shutter plates are actuated by means of a hand lever 10 which is fastened to one of them and which extends through a slot 11 formed in the frame 6. This lever 10 is preferably of resilient material and is adapted to be held in adjusted position by springing it into engagement with any one of a longitudinal series of ratchet teeth 12 formed upon the bottom wall of the slot 11. While this is the preferred means of retaining the shutter plates in adjusted position, it will be understood that any other adjusting and locking means may be employed. The shutter plates 7 are preferably faced with a packing material 13 such as rubber to prevent the entrance of air into the body of the vehicle or car when the shutter plates are in their closed position.

As above stated, the invention may be applied to either the side or the top of a closed body of an automobile, carriage, street car, railway car, or other closed vehicle which it is desired to ventilate and it may be in the form of a permanent part of the vehicle or in the form of an attachment. If desired, the tubular body 2 of the device may be made ornamental and attractive in appearance, this being especially desirable when a device is used on automobiles.

In Fig. 6 of the drawings I have illustrated the application of the invention to the upper portion or dome of a street car or railway car and it is thought that this use of the invention will be readily understood on reference to the drawings without further description.

Having thus described the invention, what is claimed is:

1. A ventilator of the character described comprising a tubular body having flared ends, a box projecting from the intermediate portion of the body and in communication therewith, a frame arranged in the open end of said box and having an open portion and a longitudinal slot, rack teeth formed on one wall of said slot, a screen covering the central opening in said frame, a plurality of shutter plates arranged transversely in said box and pivotally mounted, a rod loosely connected to the free ends of said plates for simultaneous movement, and a lever of resilient material having one end fixed and its other end projecting through the slot in said frame, said lever having an integral pawl to engage said rack teeth, said pawl being adapted to be sprung into and out of engagement with the latter.

2. A ventilator of the character described comprising a tubular body having flared ends, a box projecting from the intermediate portion of the body and in communication therewith, a frame arranged in the open end of said box and having an open portion and a longitudinal slot, rack teeth formed on one wall of said slot, a screen covering the central opening in said frame, a frame arranged in the tubular body at its junction with said box, upright pivot rods in the open portion of the last mentioned frame, a plurality of shutter plates slit and bent at one end to provide pivot ears which engage said pivot rods, a connecting rod loosely connected to the free ends of the several plates, a lever constructed of resilient material and having one of its ends fixed to one of said plates, said lever projecting through the slot in the first mentioned frame and having a handle at its free end, and its intermediate portion formed with an integral pawl adapted to engage said rack teeth.

In testimony whereof I hereunto affix my signature in the presence of two witnesses.

GRAUER C. WALKER.

Witnesses:
H. L. JOHNSONN,
IRENE E. WOLF.